United States Patent
Yeager et al.

(10) Patent No.: US 10,084,757 B2
(45) Date of Patent: Sep. 25, 2018

(54) NETWORK PRIVACY

(71) Applicants: Francis Scott Yeager, Llano, TX (US); David Wallace Cox, Destin, FL (US)

(72) Inventors: Francis Scott Yeager, Llano, TX (US); David Wallace Cox, Destin, FL (US)

(73) Assignee: REPRIVATA LLC, Palo Alto, CA (US)

(*) Notice: Subject to any disclaimer, the term of this patent is extended or adjusted under 35 U.S.C. 154(b) by 0 days.

(21) Appl. No.: 14/596,818

(22) Filed: Jan. 14, 2015

(65) Prior Publication Data

US 2015/0200915 A1    Jul. 16, 2015

Related U.S. Application Data

(60) Provisional application No. 61/927,277, filed on Jan. 14, 2014.

(51) Int. Cl.
*H04L 29/06* (2006.01)
*G06F 17/30* (2006.01)
*H04L 29/08* (2006.01)

(52) U.S. Cl.
CPC .... *H04L 63/0421* (2013.01); *G06F 17/30312* (2013.01); *H04L 63/0407* (2013.01); *H04L 63/061* (2013.01); *H04L 67/22* (2013.01)

(58) Field of Classification Search
CPC .................................................. H04L 63/0421
See application file for complete search history.

(56) References Cited

U.S. PATENT DOCUMENTS 7,787,863 B2 * 8/2010 van de Groenendaal ................. H04L 63/102 370/328
8,032,562 B2 * 10/2011 Dunn .................. G06F 21/6245 707/803

(Continued)

FOREIGN PATENT DOCUMENTS

WO    2012048347 A1    4/2012

OTHER PUBLICATIONS

International Preliminary Report on Patentability dated Jul. 19, 2016 issued in corresponding Application No. PCT/US2015/011395. Pandit et al., "Conceptual Framework and a Critical Review for Privacy Preservation in Context Aware Systems", 2012 International Conference on Cyber-Enabled Distributed Computing and Knowledge Discover, Oct. 10, 2012, pp. 435-442.

*Primary Examiner* — Kambiz Zand
*Assistant Examiner* — Thanh Le

(57) ABSTRACT

A system and method of network privacy enables end-users of a Network to have legal title or rights to all data knowingly or unknowingly transmitted while traversing a network and make individual determinations about privacy. The components may include fiber optic, copper wire, wireless satellite and or terrestrial data transport, network-level (TCP/IP) switches, an apparatus that anonymizes and redistributes user data to network data and service providers, an apparatus, system, software or process that maintains end-user security using any network protocol, any encryption method or protocol, any anonymization method and a client Graphical User Interface ("GUI").

A client GUI, electronic communication or parcel enables network end-users to option out or option into every field of end-user data that is defined and determined to be technically and contractually collectable by the network owner as (Continued)

represented to the end-user by the end-user and network owner agreement terms and conditions.

An apparatus system, software or process maintains end-user security where the end-user connects to the network using any network protocol, any encryption method or protocol and any anonymization method. An apparatus anonymizes and redistributes user data to network data and service providers that enable network data and service providers to obtain transmissions of end-user data on end-users that have optioned into an agreement to enable the transmission of selected optioned end-user data. A data transport network enables data to be transmitted securely to and from the end-users, the apparatus that anonymizes and redistributes the end-user's data and the network data and service providers. Private Communities of Trust may be infinitely replicated and use a Centralized Privacy Authority that administers ownership of end-user data by network users, end-user monetization of data, anonymization of end-user data that can be transmitted to data and service providers and prevention of unauthorized end-user data collection. Each COT provides access the End-User via the owner of the COT with and the Correspondence the COT owner has with Internet entities to clearly define the rights of the End-User in the COT and the role of the owner of the COT in relation to the End-User and the Central Privacy Authority. A secure method of allowing one end-user in one Private Secure Community of Trust to transfer information/files from that group to another end-user in a different Private Secure Community of Trust via the Central Privacy Authority.

16 Claims, 7 Drawing Sheets

(56) References Cited

U.S. PATENT DOCUMENTS

| | | | | |
|---|---|---|---|---|
| 8,201,261 | B2* | 6/2012 | Barfield | G06F 21/316 726/26 |
| 8,214,649 | B2* | 7/2012 | Wood | H04L 9/326 713/182 |
| 8,261,093 | B1* | 9/2012 | Dhesi | G06F 21/42 713/189 |
| 2003/0158960 | A1* | 8/2003 | Engberg | G06Q 20/02 709/237 |
| 2007/0067279 | A1* | 3/2007 | Bonabeau | G06F 17/30864 |
| 2008/0281622 | A1* | 11/2008 | Hoal | G06Q 30/02 705/319 |
| 2010/0318802 | A1* | 12/2010 | Balakrishnan | G06F 21/445 713/172 |
| 2011/0202986 | A1* | 8/2011 | Horn | H04L 63/0815 726/7 |
| 2013/0275504 | A1* | 10/2013 | Patel | G06Q 50/01 709/204 |
| 2013/0340028 | A1* | 12/2013 | Rajagopal | H04L 63/08 726/1 |
| 2014/0258260 | A1* | 9/2014 | Rayborn | G06Q 50/10 707/707 |

* cited by examiner

| AGE |
|---|
| GEOGRAPHIC AREA |
| BROWSING HISTORY |
| INTERESTS |
| DISINTERESTS |
| GENDER |
| OTHER INFORMATION |
| |

FIGURE 8

NETWORK PRIVACY

FIELD OF THE INVENTION

The present invention relates to generally to networking technology and, more specifically, to the storage of personal information and limitations on use of and access to personal information generated using networks.

BACKGROUND OF THE INVENTION

The growth of the Internet has made it possible for content providers to provide content to users anywhere in the world. Users benefit from a tremendous amount of information that is freely available on the Internet. The cost of delivering information and services to users via the Internet is largely subsidized by Internet advertising pursuant to ads delivered to a user pay for the users use of a service or information source. Certain information about a user is generally provided to an advertiser who serves up an ad to the user and the more accurate the user information the more an advertiser will pay to the content provider or web page owner for delivery of the ad.

While the above model works well for consumers who get the free use of Internet based services and information and for businesses who profit from providing valuable services, certain aspects of this model do not suit everybody to the same degree. For example, children who use the Internet might not be accurately characterized and therefore users in this group might be exposed to content or advertising that is not appropriate for them. For the same reason, content providers might also want to know in a more reliable manner when a user is a minor so that they can better regulate content that is sent to this group of users.

Additionally, some users might not want to provide certain information about themselves and might want to be able to better control what information is distributed, in what manner and for how long. Certain content providers also might like to cater to this user group and do so in a secure manner. However, under present protocols a need remains to address these groups and to enable end-users to manage non-standard, diverse and conflicting privacy settings for at least some Internet sources.

SUMMARY OF THE INVENTION

According to one embodiment of the present invention, end-users and sources enter into a community of trust ("COT") relationship with a centralized privacy authority. This enables end-users of a Network to make individual determinations of privacy in one instance for all network services made available through the COT and to enable the end-users to have legal title and rights to all data knowingly or unknowingly transmitted while traversing a network. Some embodiments of the invention allow a single end user to move information/files between Private Communities of Trust in a secure manner according to the rules defined in each Private Community of Trust and according to the rules defined by the end users in each Private Community of Trust. This allows a content/information/gaming/application owner to reach subscribers who are end users in a private and secure manner with knowledge about who the subscriber is, including whether or not the user is a minor, but allows the end-user to still own data about themselves and manage it via the Central Privacy Authority.

According to one embodiment of the invention, a system for mediating interactions between a user and a community of trust includes a database and a server. The database stores agreed upon user personal information. The server is coupled to the database, and facilitates communication between a user and a community of trust accessible via a network using an anonymized user indicator for the user and a secure connection. The server may provide the user exclusive access to other entities accessible via networks on an anonymized basis revealing only certain personal information associated with an anonymized user indicator. In this manner, the user's computer only communicates with the COT and other open connections are shut down allowing enhanced security and the ability to control the user of the user's information.

According to another embodiment of the invention, the server may store the user's movement in the secure Community of Trust such as in connection with a secure private movement/browsing history stored in a database in association with the user. Communications with the user may be done via a secure encrypted channel.

According to another embodiment of the invention, a method for mediating interactions between a user and a community of trust, may include provisioning a community of trust at a centralized privacy authority, provisioning a user on the community of trust, exchanging encryption keys between the community of trust and the user, assigning an anonymized identification to a user, accepting commands from the user at the community of trust, and providing by the community of trust to service providers only the anonymized identification of the user and agreed user information for sharing.

BRIEF DESCRIPTION OF THE DRAWINGS

The above described features and advantages of the present invention will be more fully appreciated with reference to the detailed description and appended figures described below.

FIG. 8 depicts an illustrative view of fields of a privacy record according to an embodiment of the invention.

DETAILED DESCRIPTION

Figure 1:
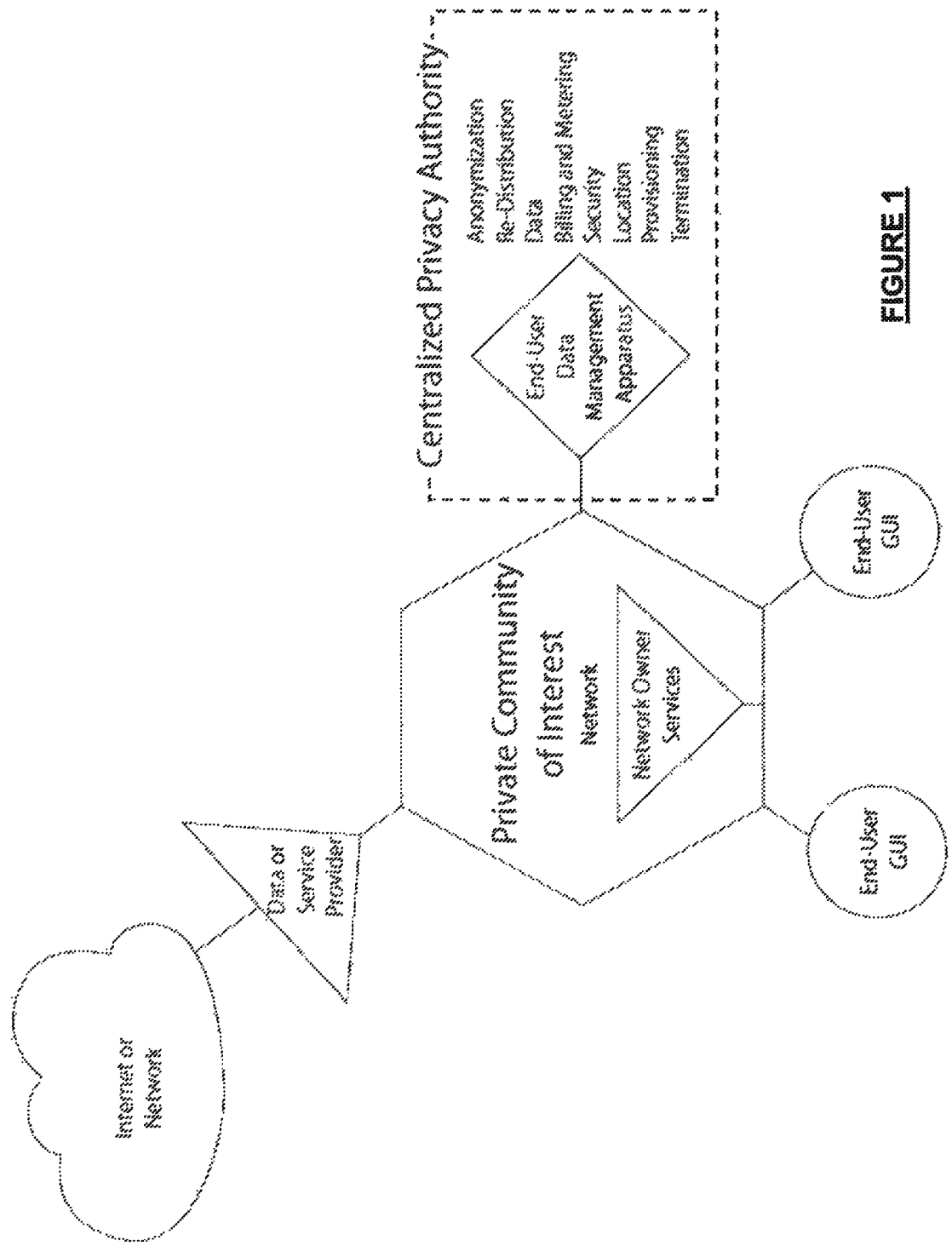
FIG. 1 is a view of an illustrative diagram of a community of trust according to one aspect of the present invention. Both the end-user and the owner of the Community of Trust (COT) use the secure encrypted anonymization approaches provided by the Centralized Privacy Authority or an authorized secure manner to accomplish the same objective of security and privacy for all parties involved in that particular Community of Trust.

The present invention includes, without limitation, a Private Secure Community of Trust (COT) or open network Interest that provides end users with content, applications and information the end user deems useful (services) and a Central Privacy Authority or privacy management apparatus that administers ownership of end-user data by network users, end-user monetization of data, anonymization of end-user data that can be transmitted to data and service providers and a system to prevent unauthorized data collection. One embodiment enables end-user data to be owned by the end-user and end-user privacy to be administered by the end-user in one instance for all services versus administration in many instances for many services. The end user in one Private Community of Trust may also transfer information/files between one end user in one instance of a Private Secure Community of Trust to another authorized user in another Private Secure Community of Trust in an authorized secure manner as a part of the services defined and controlled by the Centralized Privacy Authority.

The following detailed description and figures describe example implementations of a system and method to enable end-users of a Network to have legal title or rights to all data knowingly or unknowingly transmitted while traversing a network and make individual determinations about use of the user's information and the user's privacy. The Network may include fiber optic, copper wire, wireless, satellite and or terrestrial data transport, network-level (TCP/IP) switches, and it may interface with an apparatus that anonymizes and redistributes user data to network data and service providers, an apparatus, system, software or process that maintains end-user security using any network protocol, any encryption method or protocol, any anonymization method and a client Graphical User Interface ("GUI").

A client interface or GUI, electronic communication or parcel enables network end-users to option out or option into every field of end-user data that is defined and determined to be technically and contractually collectable by the network Community of Trust owner as represented to the end-user by the end-user and network COT owner agreement terms and conditions. The user interface may be run on a computer, personal digital assistant, mobile telephone, wearable device, or any other device capable of presenting audio and/or visual output to a user and receiving responses from the user. The input mechanism may be any kind of mechanism without limitation, including buttons, keys, touch screens, touch pads, mice, voice commands and any other input mechanism. An apparatus, system, software or process maintains end-user security where the end-user connects to the network using any network protocol, any encryption method and any anonymization method. The apparatus may anonymize and redistribute user data to network data and service providers that enable network data and service providers to obtain transmissions of end-user data on end-users that have optioned into an agreement to enable the transmission of selected optioned end-user data via the owner of each Community of Trust. On that basis, service providers can serve advertisements or otherwise provide content based on information the user has determined to share.

According to one embodiment of the invention, a data transport network enables data to be transmitted securely to and from the end-users. The apparatus that anonymizes and redistributes the end-user's data and the network data and service providers data may be managed by a Community of Trust owner. An apparatus, system, software or process may maintain end-user security where the end-user connects to the network using any network protocol, any encryption method and any anonymization method. The user may choose to securely transfer Information/Files between the End User in Private Secure Community of Trust A to another authorized end user in Private Secure Community of Trust B using any apparatus system software or process to maintain end-user security where the end-user connects to the network using any network protocol, any encryption method and any anonymization method.

Because implementations described in this specification are readily applicable to the Internet, the terms associated with the Internet (e.g. TCP/IP) are used for illustrative purposes only and different implementations may apply to any other network that relies on network protocol identifiers to transmit and receive messages. In the case of the Internet, the identifier may be an Internet Protocol address. Other networks environments in which the present invention can be used include other computer-to-computer networks, as well as telephone, voice over IP (VOIP) or any other system where the nature of communication imparts identifying information about the origination or originator of a communication.

References in this specification to specific protocols should not be deemed to limit this invention since it is capable of implementation using any network protocol, any encryption method or protocol and any anonymization method. In addition, connections and transport terms, as used in this specification, should be given their broadest meaning, including without limitation, wired or wireless connections, intranet connections, point to point connections, Internet connections, local area network connections, wide area network connections, and any combination thereof.

In more detail, still referring to the invention of FIG. 1, a client GUI, electronic communication or parcel (Collectively the "End-User Correspondence") provides detailed information about what data a Private Secure Community of Trust network or open network owner is able to technically and contractually collect from a network end-user when the end-user traverses the network owner's network via the Central Privacy Authority. This may take a variety of forms without limitation. For example:

1) The End-User Correspondence may include a statement that the end-users of the Network own legal title or rights to all data knowingly or unknowingly transmitted while traversing the network and it may include Correspondence between the End-User and the owner of the Community of Trust that defines this ownership but explains the data will be maintained on behalf of the End-User via the relationship with the owner of the COT and their Correspondence with the Central Privacy Authority.

2) The End-User Correspondence may include monetary compensation rates that the end-users can choose to receive by optioning into an agreement to sell some or all of the all data knowingly or unknowingly transmitted while traversing the network to selected network data or service providers for prescribed periods of time or in perpetuity.

3) The End-User Correspondence may include monetary exchanges for network or other services in exchange for end-users optioning into an agreement to sell some or all of the data knowingly or unknowingly transmitted while traversing the network to selected network data or service providers for prescribed periods of time or in perpetuity.

4) The End-User Correspondence may include a list of services available to network end-users and a list of data or service providers that may be promoting offers to purchase the end-user's data.

5) The End-User Correspondence may include an agreement with a Central Privacy Authority or privacy management apparatus that may be a distinct entity, separate from the owner of the Private Community of Trust Network or open network, that will administer, but not own or control the end-user's private data.

6) The End-User Correspondence may include an agreement with a Central Privacy Authority or privacy management apparatus that may be a distinct entity, separate from the owner of the Private Community of Trust Network or open network, that will allow the End-User in Private Secure Community of Trust A to securely transfer/share information/files from this instance of a Private Secure Community of Trust to another authorized End-User in another Private Secure Community of Trust B according to the rules defined in the agreements managed by the Centralized Privacy Authority.

7) The owner of the Community of Trust to which an end-user belongs may also include Correspondence with the Central Privacy Authority or privacy management apparatus that embodies all rights and agreements between the End-User and the COT owner to protect those rights on behalf of the End-User with the Central Privacy Authority.

In further detail, still referring to the invention of FIG. 1 an end-user GUI or electronic communication device, according to one embodiment of the invention, prevents the automatic rendering of cookies, tracking software or any data communication method, data capture or end-user identifier from being initiated, downloaded, uploaded or remotely executed by a network apparatus. For example:

1) A GUI or electronic communication device may transmit to one or more apparatuses that anonymizes and redistributes user data to network data and service providers.

2) A GUI or electronic communication device may transmit metering and billing data to one or more apparatuses.

3) A GUI or electronic communication device may transmit security data to one or more apparatuses.

4) A GUI or electronic communication device may transmit end-user device location data to one or more apparatus.

5) A GUI or electronic communication device may enable the remote termination of the end-user network connection.

6) The GUI or electronic communication device may be enable the secure transfer of information/files between one end-user in one Private Secure Community of Trust A to another end-user in a Private Secure Community of Trust B.

Figure 2:
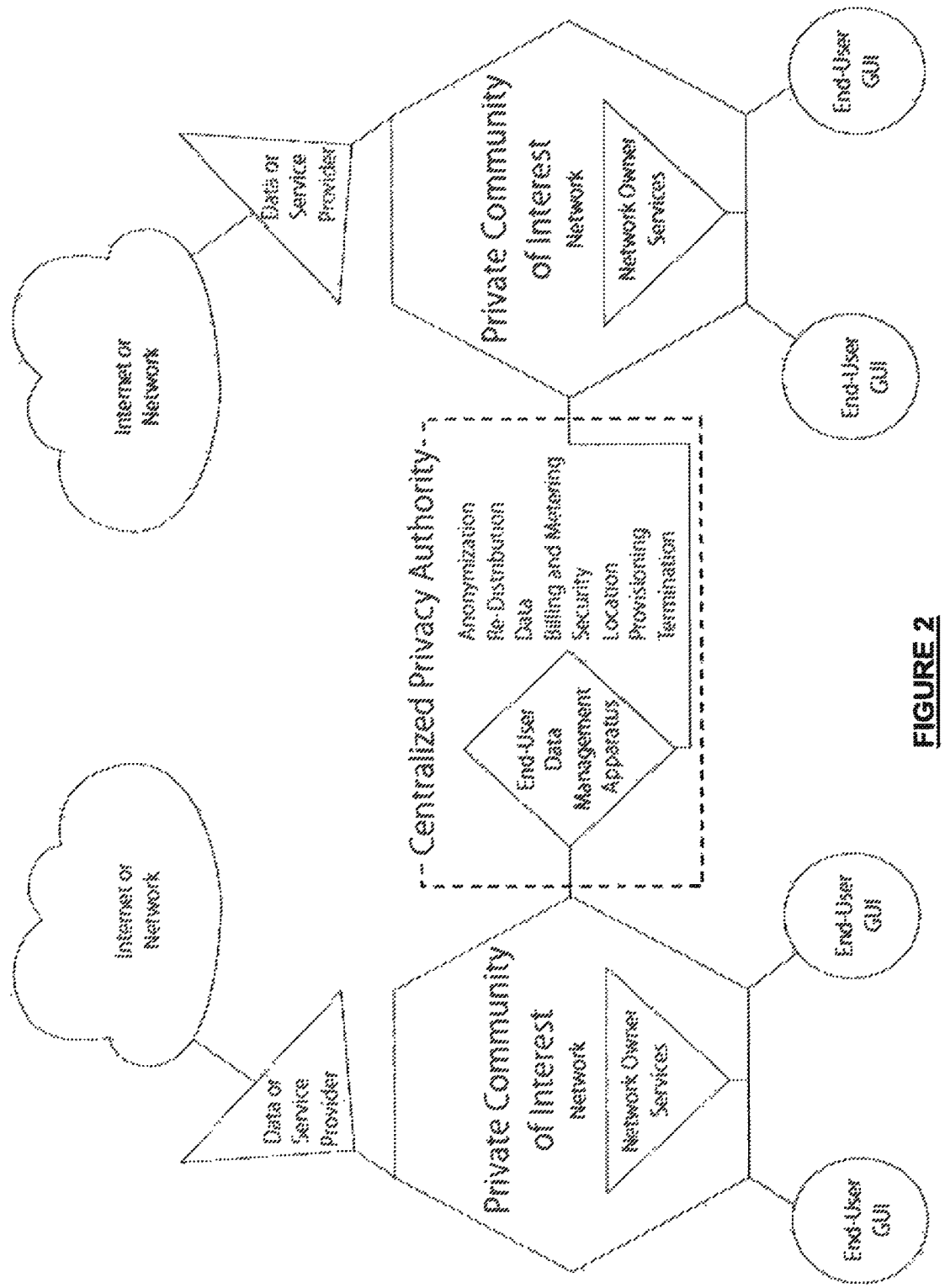
FIG. 2 is a view of an illustrative schematic of a community of trust according to one aspect of the present invention showing how the community of trust may be replicated and allow users to move securely their information between Private Communities of Trust as defined by rules agreed to by both the end users and the controllers of the Communities of Trust.

In more detail, still referring to the invention of FIG. 1, FIG. 2 illustrates the infinite replicatability of end user information according to one embodiment of the invention. By way of illustrative, non-limiting example, multiple Private Secure Communities of Trust may use a Centralized Privacy Authority that administers: (i) ownership of end-user data by network users, (ii) end-user monetization of data, (iii) anonymization of end-user data that can be transmitted to data and service providers and (iv) prevention of unauthorized end-user data collection. The CPA may also includes the Correspondence between the End-User and the owner of the COT as well as the Correspondence between the COT owner and the Central Privacy Authority and Correspondence between the owner of the COT and other content/information/gaming/application sources which may normally be on the Internet but agree to follow all the Correspondence protecting the End-user Rights as defined in the COT and End-User Correspondence and COT and Central Privacy Authority Correspond The advantages of the present invention include, without limitation, ownership of end-user data by network users, end-user monetization of data, anonymization of end-user data that can be transmitted to data and service providers and prevention of unauthorized end-user data collection. This arrangement includes the advantage of the End-User belonging to a Community of Trust owned by an entity the End-User trusts but the COT owner has Correspondence with a Centralized Privacy Authority or some other authorized secure solution to manage and protect this data on behalf of the End-User who joins the Community of Trust.

According to one embodiment, a Network enables end-user data to be owned by the end-user and end-user privacy to be administered by the end-user in one instance for all services associated with a COT rather than administration in many instances for many services. It also allows one end-user in one Private Secure Community of Trust A to securely transfer information/files from this first instance of a Private Secure Community of Trust to an authorized and end-user in another Private Secure Community of Trust B as agreed to by the end-users and tracked by the Centralized Privacy Authority or an authorized secure manner.

Figure 3:
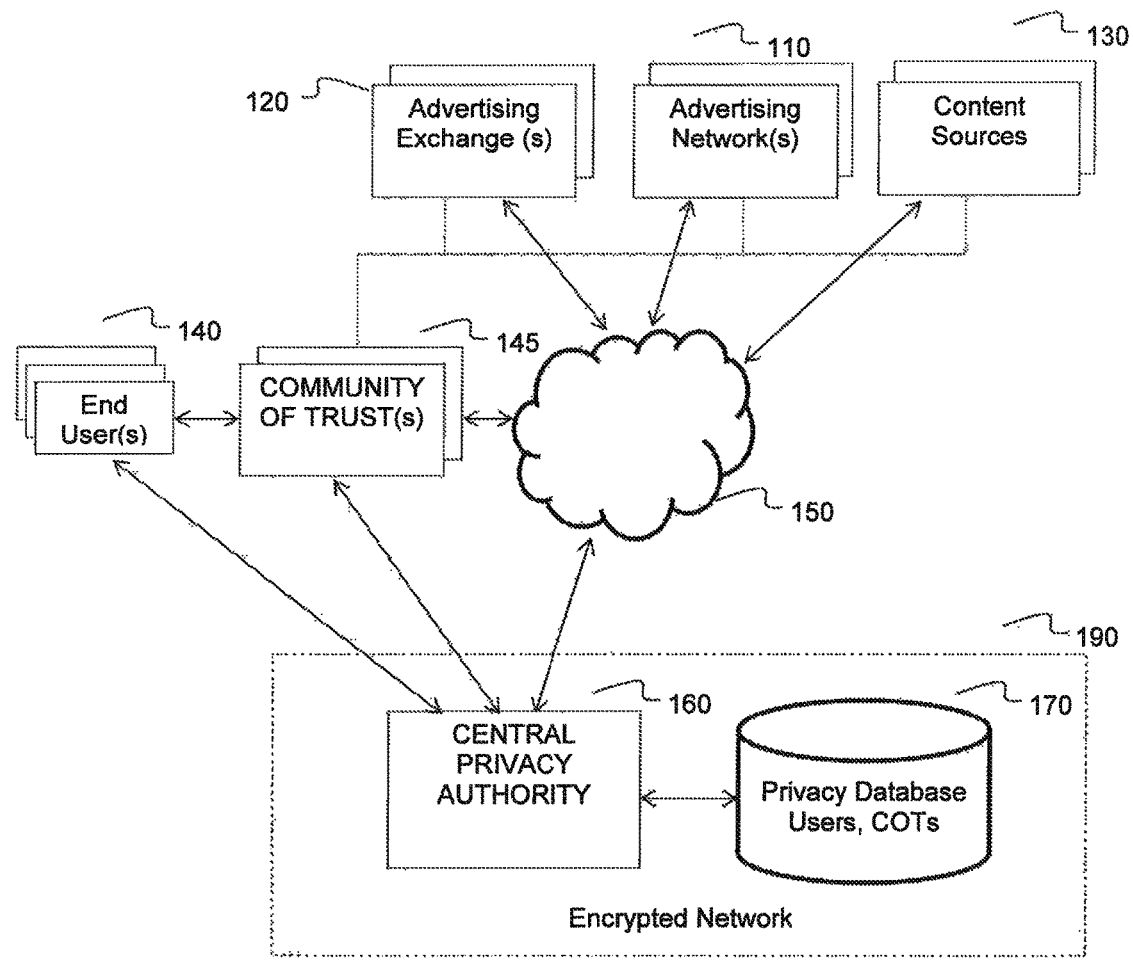
FIG. 3 depicts an illustrative view of users in relation to communities of trust, a central privacy authority and sources of content and advertising according to one embodiment of the Invention.

FIG. 3 depicts an illustrative implementation of a Central Privacy Authority 160 and its interactions with users 140, communities of trusts 145, and other entities accessible via the owner of the COT based on the Correspondence the COT owner has with Internet entities to clearly define the rights of the End-User in the COT and the role of the owner of the COT in relation to the End-User and the Central Privacy Authority. The network 150 may include the Internet, private networks, or other interconnected networks without limitation and may include wired, optical, wireless or any other type of network whether based on TCP/IP or other protocols. FIG. 3 further depicts content sources 130, advertising exchanges 120 and advertising networks 110 that are coupled to the COT and the CPA via a network 150. Referring to FIG. 3, the user 140 may establishes a secure connection with the central privacy. This connection may be through the user's ISP using a secure socket connection. The user device 140 may be any kind of device, without limitation including the user's computer, TV, Gaming Console, wireless telephone, personal digital assistant, wearable computing device or any other type of access device including but not limited to an Artificial Intelligence Device or any other type of device. The device may include wireless connections such as 802.11 WLAN, Bluetooth or any other type of wireless connection, optical connection, wired connections or combinations thereof to reach the CPA or COT. Other devices not limited to computers, may also be configured with privacy software to establish this secure connection and at the same time shut off access to the Internet via other channels. In this manner, the user may interact with a CPA, one or more COTs and the entities accessible via the Internet or network 150 via a secure and controlled connection where the CPA is mediating and anonymizing the user's information made available to the COTs and the other entities.

The COTs also may have a secure socket connection to the CPA 160 and to the various entities shown connected to the network 150. Alternatively or in addition, the COTs may have an open Internet type connections to the other entities. When a user signs up with a COT and the CPA, the user agrees with the COT and CPA on the type of information that the user will provide and make available to the CPA, the COT and other entities who access the End-User via the owner of the COT based on the Correspondence the COT owner has with Internet entities. The Correspondence generally seeks to clearly define the rights of the End-User in the COT and the role of the owner of the COT in relation to the End-User and the Central Privacy Authority. The user may be given the option to allow more or less personal information to be shared. In addition, the user may be given the option to share more information in exchange for compensation from the CPA, COT or another entity accessible via the network 150. Types of information that may be provided by the user or collected and associated with the user during the user's use of the CPA and COT may include, as shown in FIG. 8, the user's age, geographic location or geographic area, browsing history, interests, disinterests, gender, and other information. The CPA may have access to additional user information such as the user's name and billing address, but typically this information would not be among the privacy information that would be permitted to be shared with the COT or other entities. HIPAA information and medical records and banking information are other examples of information that would not be generally shared. There may be exceptions to this in certain circumstances when the sharing is permitted with particular entities or under certain circumstances.

The agreements among the user, COT and CPA specify the business rules for allowing the sharing of user information, the terms of compensation to the user for sharing certain user information with the COT or other websites or entities who access the End-User via the owner of the COT based on the Correspondence the COT owner has with Internet entities to clearly define the rights of the End-User in the COT and the role of the owner of the COT in relation to the End-User and the Central Privacy Authority. The Correspondence may include monthly subscription fees if any, provisioning information and other terms of the business relationship. The CPA interacts with the database 170 and administers business rules based on these agreements to permit user information be anonymized and shared according to certain parameters.

The information in the database may include, among other things, anonymizing information for the user. This information is then used by the COT and other websites to keep track of the user. However, the CPA or the CPA/COT can change the anonymizing information for the user at any time so that only the CPA or CPA/COT has a complete set of information about the user. Other entities will not be able to associate information with a particular user other than with anonymized information that may only be temporarily associated with a specific user. Depending on the business rules and agreement between the user and COT or the user and the CPA and the COT, the COT may only have anonymized user information and may also not be able to track the user.

Figure 4:
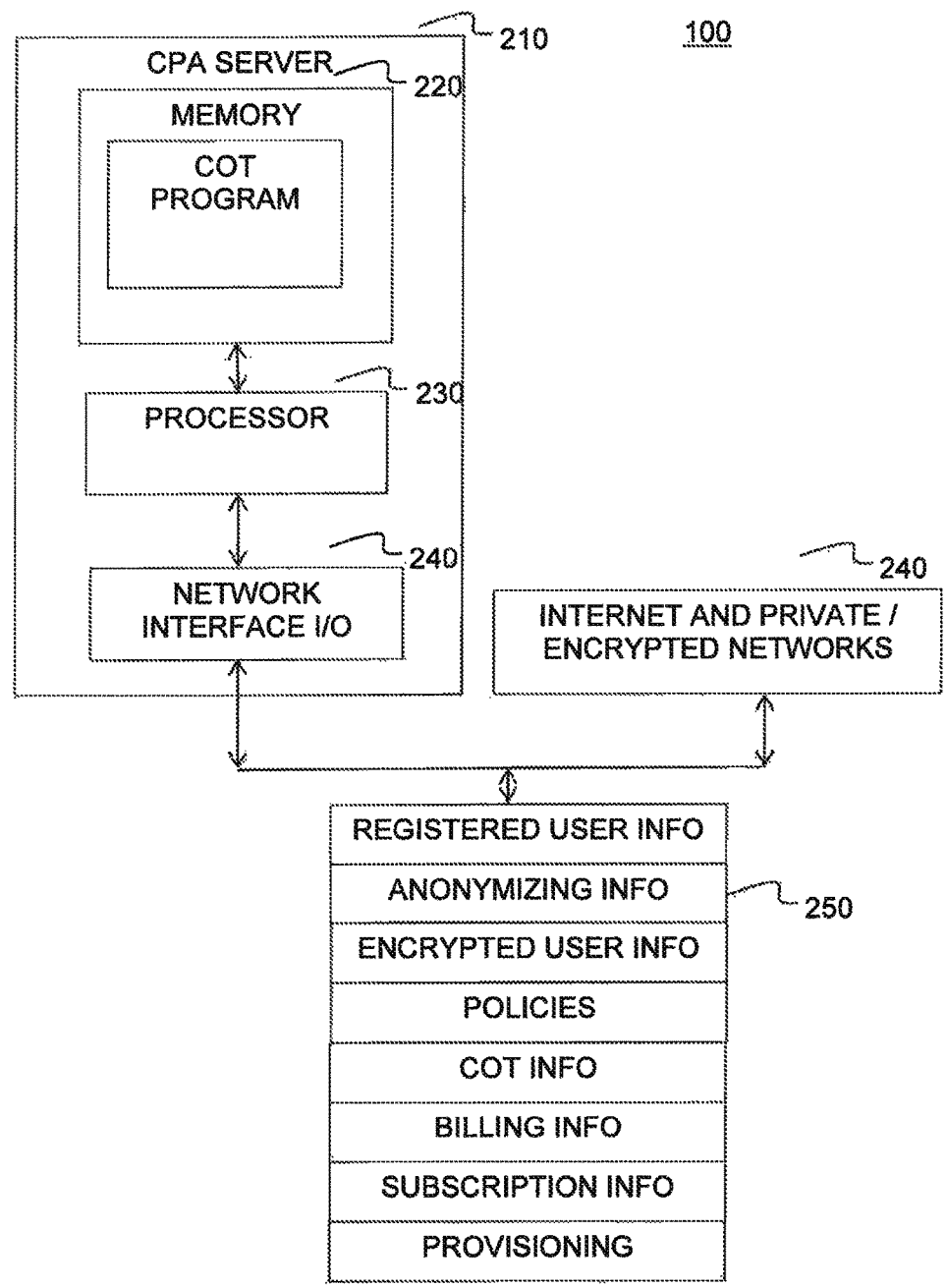
FIG. 4 depicts an illustrative server and database associated with a central privacy authority according to an embodiment of the present invention.

FIG. 4 depicts an illustrative view of a CPA server 210. The server 210 may include a memory 220, a processor 230 and a network interface 240. The memory may include disk drives, network storage, random access memory, non-volatile memory and/or other types of memory. In general, the memory stores one or more community of trust programs that implement the protocols and business rules for the CPA and its interactions with users, COTs and other entities who access the End-User via the owner of the COT with the Correspondence the COT owner has with Internet entities to clearly define the rights of the End-User in the COT and the role of the owner of the COT in relation to the End-User an the Central Privacy Authority.

The processor executes program instructions associated with the COT program in order cause the server to interact with the users, COTs and other entities over the networks via the network interface and I/O unit 240. The server also interacts with the CPA database 250, which may include registered user information, anonymizing information, encrypted user information, policy information including business rules associated with COTs and individual users, COT information, billing information, subscription information and provisioning information. The server 210 may access the database in order to provision users. In one example, a new user may be set up with anonymizing information and encryption keys that are shared with the COT. The user may have one key and the COT another. In another model the user may have a key and the COT and CPA may have the other, in a public key private key pair. In any event, user/COT/CPA agreements may be set up so that the user owns the user's own data and the keys are distributed so that the users data is encrypted in the CPA and only the user or the COT can decrypt the data. This makes the user data both anonymized and secure as stored in the CPA and the COT so that the user data, owned by the user, is only accessible by the user or with the user's explicit permission. Other entities may not be able to obtain the information by any lawful means and only the user as its owner may provide the information or access.

Figure 5:
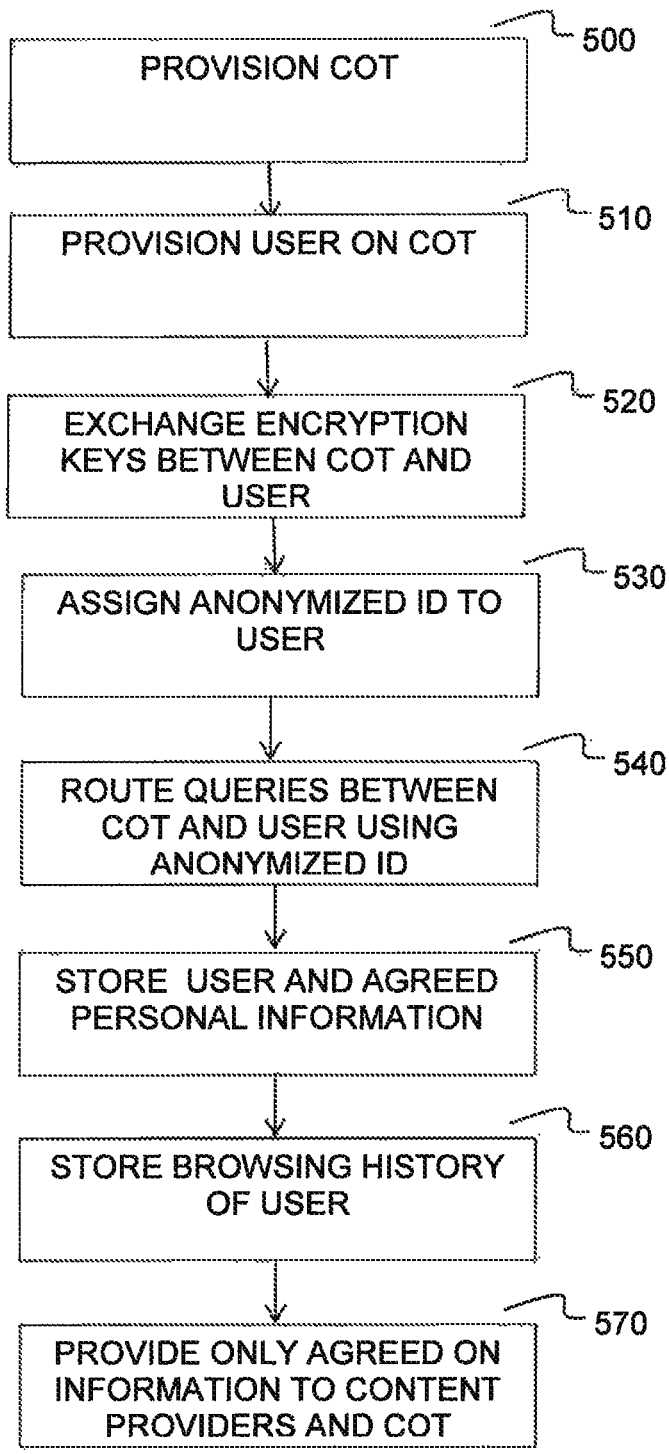
FIG. 5 depicts a method of provisioning a COT and users associated with a COT according to an embodiment of the invention.

FIG. 5 depicts a method of operating a CPA to set up a COT and user according to one embodiment of the invention. Referring to FIG. 5, in step 500 a COT is provisioned and business rules are established between the COT and CPA that will ultimately apply to users. In step 510 a user is provisioned, which may include setting up user address information, IP address information or other network address information for a user's device(s), billing information, privacy preferences including interests and disinterests, and other information pertaining to how the users anonymized personal information may be shared and whether there should be any compensation for the sharing of information.

In step 520, encryption keys may be exchanged between the CPA, user and COT in order to facilitate secure communications and also to allow information to be stored in an encrypted format so that it is less prone to being surreptitiously stolen and used. The keys may be any type of encryption keys and may include, in one example, a public and private key pair in which the user holds one and the COT and/or CPA holds another. In step 530 an anonymized ID is assigned to the user which may be used by the COT and private COT secure locations inside the COT such as specialized websites for interacting with the user as if the user were not anonymized. The anonymization may be changed frequently, infrequently, on request or according to any parameter or business rule to allow the user to interact with a COT and private COT locations or websites while leaving as much or as little personal information as desired with such entities. In this manner, the user can control the amount of user information that is used to provide content or advertising to the user, control the user experience better, direct information more in line with the users interests to the user and exclude information in which the user is disinterested or which is not permitted given the user's age or other attributes articulated in business rules and/or the Correspondence. The user's anonymized profile may be made selectively available to the COT and other entities who access the End-User via the owner of the COT with the Correspondence the COT owner has with Internet entities to clearly define the rights of the End-User in the COT and the role of the owner of the COT in relation to the End-User and the Central Privacy Authority. This is done in order to allow a more transparent and controlled experience and to allow the user to capture some benefit from making accurate information available about the user and the user's preferences and dislikes.

In step 540, the CPA routes queries and other information or commands between the user and the COT and the user and other sites using the anonymized user id. In step 550, the CPA stores the agreed upon personal information and in step 560 the CPA may also store the user's browsing history. In general, this information is stored in an encrypted manner within the CPA though it may also be stored in a non-encrypted manner.

In step 570, the CPA provides only agreed upon anonymized information (personal information and history information, for example) to content providers who form their own Community of Trust and other COTs. In exchange, the CPA may collect compensation from entities on the web who provide information or services to the user who access the End-User via the owner of the COT with the Correspondence the COT owner has with Internet entities to clearly define the rights of the End-User in the COT and the role of the owner of the COT in relation to the End-User and the Central Privacy Authority.

Figure 6:
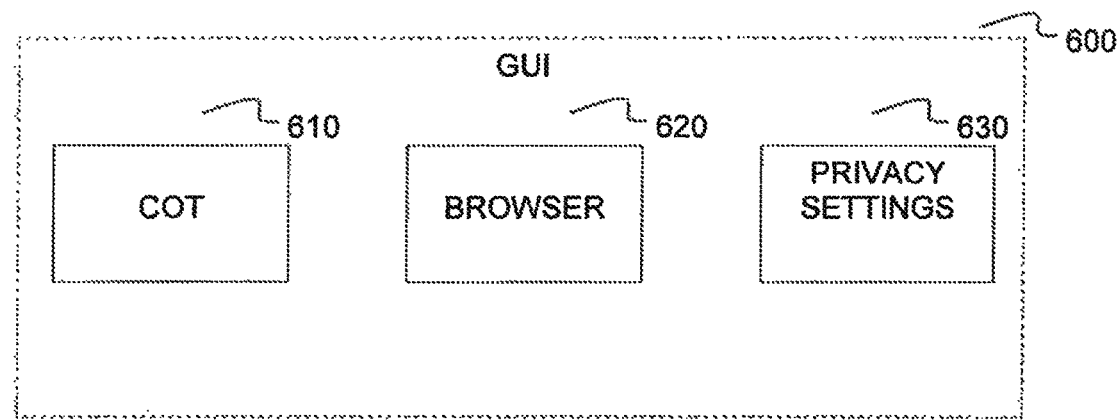
FIG. 6 depicts a graphical user interface according to one embodiment of the invention.

FIG. 6 shows a graphical user interface which may be presented to the user according to an embodiment of the invention. Referring to FIG. 6, the user's computer or any other access device without limitation may run a CPA program in memory with program instructions executed by the processor of the user's device to allow the user to click a link to start the program and display the GUI and choices shown. It should be noted that the user interface need not be graphical and could be audio only or audio visual as described elsewhere herein, without limitation. The choices may include accessing the COT functioning as a custom secure application or software that includes the ability to follow HTTP and Internet protocols, browse and render audio and/or visual information received as web pages, or in other formats, as defined by the rules/Correspondence of the COT and allowing the user to alter privacy settings of the CPA. The user may interact with the GUI via a display using touch screen input, a mouse, keyboard, voice or audio or in any other convenient manner including but not limited to smart phones, mobile phones, tablets, other smart devices, wearable devices and any other devices that may or may not exist at the time of this filing including but not limited to artificial intelligence devices. The user's device also generally uses a networking unit that is wireless, wired, optical or another format to allow the user to access the CPA. Access may be provided via Internet service provider or other telephony or high speed network connection or any wireless technology. The connection to the CPA may be accomplished via a secure, encrypted socket.

Figure 7:
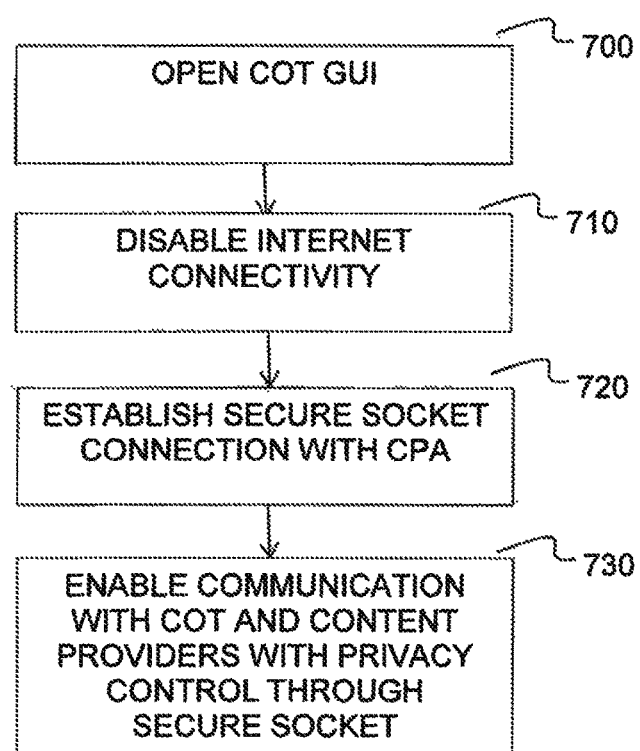
FIG. 7 depicts a method of using a COT according to one embodiment of the invention.

FIG. 7 shows a flow chart of steps that the user's CPA software may provide including: opening the GUI in step 700. The program may disable other Internet connectivity during the connection to the CPA so that the privacy controls may not be defeated in step 710. In step 720, the user's computer establishes a connection or a secure connection with the CPA. In step 730, the user's computer uses the connection set up to enable communication with the COT and other entities such as content providers where the COT and/or CPA enable interaction using an anonymized user id and provide selective user information according to the user's settings and agreement with the CPA and the COT. FIG. 8 depicts an illustrative and non-exhaustive list of a user's personal anonymized information which may or may not be shared with third parties according to the user's preferences and the user's agreement with the COT and/or CPA.

While particular embodiments have been shown and described herein, it will be understood by those having ordinary skill in the art that changes may be made to those embodiments without departing from the spirit and scope of the invention. For example, while particular types of information have been identified in association with a user's privacy profile, it will be understood that any information may be associated with a user's privacy profile and may be treated in accordance with the principles provided herein. Additionally, the user device and user interface may be any type of device without limitation that allow the user to interact with content available from a network. The software running on the user device that renders a display to the user may be in the form of an application or "app" downloaded to the user's device, may be a network based application or otherwise may be any piece of program code. The user interface software may, for example, be capable of parsing and rendering HTML content.

References in this specification to specific protocols should not be deemed to limit this invention since it is capable of implementation using any network protocol, any encryption method or protocol and any anonymization method and any access device. In addition, connections and transport terms, as used in this specification, should be given their broadest meaning, including without limitation, wired or wireless connections, intranet connections, internet connections, local area network connections, wide area network connections, and any combination thereof.

While this written description of the invention may enable one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Because implementations described in this specification are readily applicable to the Internet, the terms associated with the Internet (e.g. TCP/IP) are used for illustrative purposes only and different implementations may apply to any other network that relies on network protocol identifiers to transmit and receive messages. In the case of the Internet, the identifier may be an Internet Protocol address. Other networks environments in which the present invention can be used include other computer-to-computer networks, as well as telephone, voice over IP (VOIP) or any other system where the nature of communication imparts identifying information about the origination or originator of a communication.

What is claimed is:

1. A system for mediating interactions between a user and a community of trust, comprising:

a database configured to store agreed-upon user personal information; and a server coupled to the database, the server being configured to facilitate communication between a user and a community of trust that includes third party websites accessible via a network using:
  an anonymized user indicator for the user; and
  a secure encrypted channel connection; and a user device configured to shut communication channels, except with the server, during use of the community of trust, such that all communication with the user device is performed through the secure encrypted channel connection;

wherein the anonymized user indicator and the secure encrypted channel connection cause the user to be anonymous to the third party websites, and wherein, during use of the community of trust, the user device can directly communicate via the secure encrypted channel only with the community of trust and the server.

2. The system according to claim 1, wherein the server further provides the user exclusive access to other entities accessible via networks on an anonymized basis revealing only certain personal information associated with an anonymized user indicator.

3. The system according to claim 1, wherein the server stores a browsing history in a database in association with the user.

4. The system according to claim 1, wherein the user personal information includes age and geographic information.

5. The system according to claim 1, further including a graphical user interface (GUI) configured to:
  facilitate secure private browsing: and
  capture all activities as between the user and the community of trust in the database to create a user history.

6. The system according to claim 1, wherein the user personal information further includes likes.

7. The system according to claim 1, wherein the user personal information further includes dislikes.

8. A method for mediating interactions between a user and a community of trust, comprising:
  provisioning a community of trust at a centralized privacy authority;
  provisioning a user device on the community of trust;
  exchanging encryption keys between the community of trust and the user device;
  assigning an anonymized identification to a user;
  accepting commands from the user at the community of trust;
  communicating with the user device only via a secure encrypted channel using the encryption keys;
  shutting down any communication channels involving the user device, except for the secure encrypted channel; and
  providing, by the community of trust to service providers, only the anonymized identification of the user and agreed user information for sharing,
  wherein, during use of the community of trust, the user device can directly communicate via the secure encrypted channel only with the community of trust and the centralized privacy authority.

9. The method according to claim 8, further comprising storing user information, including the agreed upon user information in the centralized privacy authority.

10. The method according to claim 9, further comprising providing the user exclusive access to other entities accessible via networks on an anonymized basis, revealing only certain personal information associated with an anonymized user indicator.

11. The method according to claim 10, wherein the other entities include third party websites, advertisers, and content providers that provide content based on the anonymized user indicator, which does not reveal personal information of the user.

12. The system according to claim 9, further comprising storing in the central privacy authority the user's browsing history in a database in association with the user.

13. The method according to claim 9, wherein the user's device exclusively communicates via the secure encrypted channel with the centralized privacy authority during the user's use of the centralized privacy authority.

14. The method according to claim 9, wherein the agreed user information includes age and geographic information.

15. A computer program product that comprises a non-transient, computer usable medium having computer program logic stored therein, the computer program logic being capable of execution by a computer processor, comprising:
  provisioning logic for causing a processor to provision a community of trust at a centralized privacy authority;
  provisioning logic for causing a processor to provision a user device on the community of trust;
  exchanging logic for causing a processor to exchange encryption keys between the community of trust and the user device;
  disabling logic for causing a processor to disable Internet connectivity of the user device;
  establishing logic for causing a processor to establish a secure connection with the centralized privacy authority;
  assigning logic for causing a processor to assign an anonymized identification to a user;
  accepting logic for causing a processor to accept commands from the user at the community of trust; and
  providing logic for causing a processor to provide, by the community of trust to service providers, only the anonymized identification of the user and agreed user information for sharing,
  wherein, during use of the community of trust, the user device can directly communicate via the secure encrypted channel only with the community of trust and the centralized privacy authority.

16. A computer program product that comprises a non-transient, computer useable medium having computer program logic stored therein, the computer program logic being capable of execution by a computer processor, comprising:
  opening logic for causing a processor to open a user interface;
  disabling logic for causing a processor to disable Internet connectivity;
  establishing logic for causing a processor to establish a secure connection with a privacy server; and
  enabling logic for causing a processor to enable a user to communicate with a community of trust and content providers through the privacy server,
  wherein, during use of the community of trust, the user device can directly communicate via the secure encrypted channel only with the community of trust and the centralized privacy authority.

* * * * *